(12) United States Patent
Ronk et al.

(10) Patent No.: US 8,633,284 B2
(45) Date of Patent: Jan. 21, 2014

(54) TAILORABLE POLYIMIDE PREPOLYMER BLENDS, CROSSLINKED POLYMIDES AND ARTICLES FORMED THEREFROM

(75) Inventors: Warren R. Ronk, West Chester, OH (US); Stephen M. Whiteker, Covington, KY (US)

(73) Assignee: General Electric Company, Schenectady, NY (US)

( * ) Notice: Subject to any disclaimer, the term of this patent is extended or adjusted under 35 U.S.C. 154(b) by 1090 days.

(21) Appl. No.: 11/757,683

(22) Filed: Jun. 4, 2007

(65) Prior Publication Data

US 2007/0265424 A1 Nov. 15, 2007

Related U.S. Application Data

(63) Continuation-in-part of application No. 11/383,079, filed on May 12, 2006, now abandoned, and a continuation-in-part of application No. 11/383,086, filed on May 12, 2006, now abandoned, and a continuation-in-part of application No. 11/383,092, filed on May 12, 2006, now abandoned, and a continuation-in-part of application No. 11/383,100, filed on May 12, 2006, now abandoned, and a continuation-in-part of application No. 11/383,104, filed on May 12, 2006, now abandoned.

(51) Int. Cl.
*C08L 79/08* (2006.01)

(52) U.S. Cl.
USPC .......................................... 525/436; 525/432

(58) Field of Classification Search
USPC .................................. 525/432, 436
See application file for complete search history.

(56) References Cited

U.S. PATENT DOCUMENTS

| | | |
|---|---|---|
| 5,041,526 A | 8/1991 | Riel et al. |
| 5,091,466 A | 2/1992 | Aftergut et al. |
| 5,101,005 A | 3/1992 | Vora et al. |
| 5,145,916 A * | 9/1992 | Yamamoto et al. ........... 525/421 |
| 5,177,180 A | 1/1993 | Griffin et al. |
| 5,331,063 A * | 7/1994 | Pater et al. .................... 525/421 |
| 5,338,827 A | 8/1994 | Serafini et al. |
| 5,478,913 A | 12/1995 | Boyce et al. |
| 5,648,432 A | 7/1997 | Pater et al. |
| 5,705,574 A | 1/1998 | Lubowitz et al. |
| 5,770,676 A | 6/1998 | Pater et al. |
| 5,965,687 A | 10/1999 | Jensen |
| 6,036,900 A | 3/2000 | Munk et al. |
| 6,103,864 A | 8/2000 | Alstin et al. |
| 6,127,509 A | 10/2000 | Pratte et al. |
| 6,133,401 A | 10/2000 | Jensen |
| 6,184,333 B1 | 2/2001 | Gray |
| 6,303,744 B1 | 10/2001 | Meador et al. |
| 6,531,568 B1 | 3/2003 | Shibuya et al. |
| 6,713,597 B2 | 3/2004 | Lindway |
| 6,743,841 B2 | 6/2004 | Shimizu et al. |
| 6,784,276 B1 | 8/2004 | Chuang |
| 6,822,032 B2 | 11/2004 | Callucci |
| 6,841,652 B2 | 1/2005 | Connell et al. |
| 2005/0080229 A1 | 4/2005 | Deets et al. |

FOREIGN PATENT DOCUMENTS

| | | |
|---|---|---|
| EP | 0374518 A1 | 6/1990 |
| EP | 0393826 A2 | 10/1990 |
| EP | 0593200 A1 | 4/1994 |
| EP | 0748650 A2 | 12/1996 |
| EP | 1148078 A1 | 10/2001 |
| EP | 1273611 A1 | 1/2003 |
| JP | 59108030 | 6/1984 |
| JP | 2004099731 A | 4/2004 |
| WO | 8700845 | 2/1987 |
| WO | 9824830 | 6/1998 |
| WO | 0069948 | 11/2000 |
| WO | 2005019291 A1 | 3/2005 |

* cited by examiner

*Primary Examiner* — Ana Woodward
(74) *Attorney, Agent, or Firm* — McNees Wallace & Nurick LLC

(57) ABSTRACT

A polyimide prepolymer blend including a first prepolymer component comprising a first polyimide oligomer having the formula $E_1\text{-}[R_1]_n\text{-}E_1$ and a second prepolymer component selected from $M_1$, a second polyimide oligomer having the formula $E_2\text{-}[R_2]_n\text{-}E_2$, and combinations thereof; where $R_1$ and $R_2$ independently comprise:

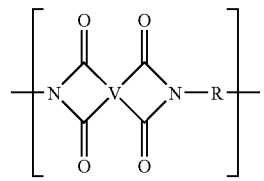

where n is from about 1 to about 5, V is a tetravalent substituted or unsubstituted aromatic monocyclic or polycyclic linking structure, R is a substituted or unsubstituted divalent organic radical. $E_1$ and $E_2$ independently comprise crosslinkable functional groups. $M_1$ comprises a mixture of monomeric compounds including a diamine component, a dianhydride component, and an end group component. The prepolymer blend, prior to cure, provides at least one predetermined prepolymer blend property; and when cured under suitable cure conditions, the prepolymer blend provides a crosslinked polyimide matrix having at least one predetermined crosslinked matrix property.

16 Claims, No Drawings

TAILORABLE POLYIMIDE PREPOLYMER BLENDS, CROSSLINKED POLYMIDES AND ARTICLES FORMED THEREFROM

FIELD OF THE INVENTION

The present invention relates generally to polyimide prepolymer blends, crosslinked polyimide matrices formed from polyimide prepolymer blends, and polyimide articles.

BACKGROUND OF THE INVENTION

Addition-type polyimides, derived from end-capped polyimide oligomers, typically undergo thermal cross-linking or chain extension to form a crosslinked polyimide resin. Addition-type polyimides provide suitable matrix materials for high temperature polymer matrix composites due to their desirable heat resistance, desirable mechanical properties, desirable tribilogical properties, high chemical resistance and high radiation resistance. However, the processibility of given polyimides are limited and the range of properties are limited to the particular type of polyimide fabricated.

High temperature parts, such as gas turbine engine components are typically fabricated by a hand lay-up method. The hand lay-up method typically includes positioning a prepreg fiber onto a mold and pouring a liquid resin onto the fiber. The curing typically takes place at room temperature and the blend is rolled to work out any air bubbles and to fully distribute the resin. In addition, the manipulation of the resin to remove air bubbles and to distribute the resin may result in damage to the fibers making up the composite. This method suffers from the drawback that the processing method is labor intensive and suffers from high costs. Alternative methods, such as resin film infusion (RFI), are desirable techniques due to the decreased labor costs related to performing RFI and the reproducible parts that may be achieved. The curing typically takes place at elevated temperatures in an autoclave and the cure is done in a vacuum bag under high pressure (typically 100-200 psi) in order to make the resin flow and remove entrapped air and condensable gases. However, conventional polyimide oligomers lack the processability required for fabrication of parts using RFI. For example, known polyimides typically include a high melting or low molecular weight powder, but lack the flexibility of the combination of melting temperature and molecular weight that is desirable for processing techniques, such as RFI.

Currently, addition-type polyimides are used either as a monomeric solution (e.g., PMR-15 monomeric solutions) which reacts in a 2 step fashion to form a crosslinked system or as preimidized powders which melt prior to crosslinking to again form a crosslinked system. Monomeric solutions of prepolymer polyimides typically include a diamine, a dianhydride and an end blocking agent having a crosslinkable group. PMR-15, for example, is a reaction product of monomethyl ester of 5-norbornene 2,3-dicarboxylic acid, dimethyl ester of 3,3',4,4'-benzophenone tetracarboxylic acid and 4,4' methylenedianiline (MDA). PMR-15 is a material that has found extensive use in gas turbine engine component manufacture. However, the partially unreacted solutions of PMR-15 include MDA, which is a known carcinogen and is a known liver and kidney toxin. Fully reacted under cured PMR-15 compound mixtures no longer contain MDA and are less hazardous to handle. Nonetheless, while the properties of PMR-15 are suitable for use in the fabrication of higher temperature gas turbine engine parts, the use of MDA during the fabrication of the polyimide resin significantly increases costs and processing complexity.

What is needed is a polyimide prepolymer and crosslinked polyimide system that includes properties that may be tailored to particular applications and are fabricated by methods that include less hazardous chemicals. Further, what is needed is a method for fabricating polyimide materials that reduces or eliminates the requirement for hazardous and/or carcinogenic materials.

SUMMARY OF THE INVENTION

In an exemplary embodiment, a prepolymer blend includes a first prepolymer component comprising at least a first polyimide oligomer having the formula $E_1$-$[R_1]_n$-$E_1$; and a second prepolymer component selected from the group consisting of $M_1$, a second polyimide oligomer having the formula $E_2$-$[R_2]_n$- $E_2$, and combinations thereof; wherein $R_1$ and $R_2$ independently comprise the following structure:

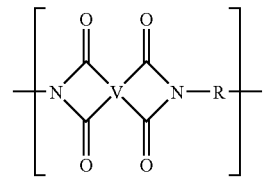

wherein n comprises from about 1 to about 5, wherein V is a tetravalent substituted or unsubstituted aromatic monocyclic or polycyclic linking structure, R is a substituted or unsubstituted divalent organic radical, $E_1$ and $E_2$ independently comprise crosslinkable functional groups, and wherein $M_1$ comprises a mixture of monomeric compounds including a diamine component comprising at least one diamine compound, a dianhydride component comprising at least one dianhydride compound, and an end group component comprising at least one end group compound. The exemplary prepolymer blend, prior to cure, provides at least one predetermined prepolymer blend property, and when cured under suitable cure conditions, the prepolymer blend provides a crosslinked polyimide matrix having at least one predetermined crosslinked property.

In an exemplary embodiment, there is provided a crosslinked polymer matrix formed after cure under suitable cure conditions of an exemplary prepolymer blend and having a glass transition temperature of at least about 450° F. (232° C.).

In an exemplary embodiment, a gas turbine engine component comprises the crosslinked polymer matrix formed from an exemplary prepolymer blend.

In another exemplary embodiment, there is provided a prepreg consisting essentially of a fibrous substrate impregnated with an exemplary prepolymer blend.

In an exemplary embodiment, a prepolymer blend comprises a prepolymer blend including a first prepolymer component comprising at least a first polyimide oligomer having the formula $E_1$-$[R_1]_n$-$E_1$; and a second prepolymer component selected from the group consisting of $M_1$, a second polyimide oligomer having the formula $E_2$-$[R_2]_n$-$E_2$, and combinations thereof; wherein $R_1$ and $R_2$ independently comprise the following structure:

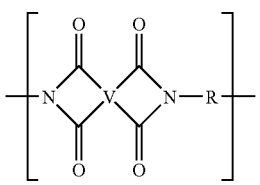

wherein n comprises from about 1 to about 5, wherein V is a tetravalent substituted or unsubstituted aromatic monocyclic or polycyclic linking structure, R is a substituted or unsubstituted divalent organic radical, $E_1$ and $E_2$ independently comprise crosslinkable functional groups, and wherein $M_1$ comprises a mixture of monomeric compounds including a diamine component comprising at least one diamine compound, a dianhydride component comprising at least one dianhydride compound, and an end group component comprising at least one end group compound. The exemplary prepolymer blend, prior to cure, provides at least one predetermined prepolymer blend property selected from melt viscosity of the prepolymer blend, and a molecular weight of the prepolymer blend, and when cured under suitable cure conditions, the prepolymer blend provides a crosslinked polyimide matrix having at least one predetermined crosslinked property selected from thermal oxidative stability, glass transition temperature, molecular weight, and void content. In an exemplary prepolymer blend, the first and second prepolymer components are present in predetermine relative amounts dependent upon the predetermined prepolymer blend property, the predetermined crosslinked matrix property, or a combination thereof.

DETAILED DESCRIPTION OF THE INVENTION

One embodiment includes prepolymer mixtures for forming polyimide resins. One embodiment includes a polyimide prepolymer mixture having a first prepolymer component and a second prepolymer component. The first prepolymer component includes compounds having the following formula (I):

$$E_1\text{-}[R_1]_n\text{-}E_1 \tag{I}$$

The second prepolymer component includes compounds having one or more of the following formula (II) and (III):

$$E_2\text{-}[R_2]_n\text{-}E_2 \tag{II; or}$$

$$M_1 \tag{III}$$

wherein n is from about 1 to about 1000 structural units or more. The repeating structural units may also include from about 10 to about 750 structural units or from about 50 to about 500 structural units. $R_1$ and $R_2$ in each formulas (I) or (II) independently include groups having the following formula (IV):

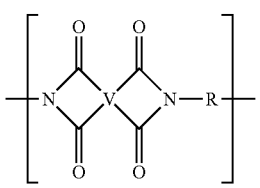

(IV)

wherein V is a tetravalent substituted or unsubstituted aromatic monocyclic or polycyclic linking structure, preferably including from about 5 to about 50 carbon atoms. Substitutions in the linking structures may include, but are not limited to ethers, epoxides, amides, esters and combinations thereof. Exemplary linking structures suitable for use as V in formula (IV) include the following formulas:

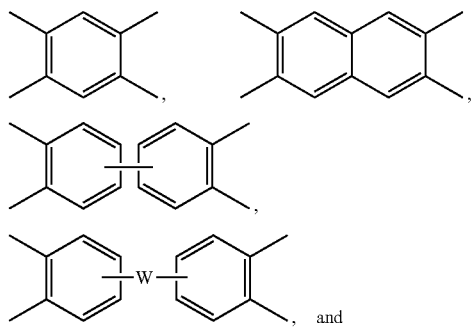

combinations thereof, wherein W is a divalent moiety selected from the group consisting of —O—, —S—, —C(O)—, —SO$_2$—, —SO—, —C$_y$H$_{2y}$— (y being an integer from 1 to 5), and halogenated derivatives thereof. In addition, W may include a moiety selected from the group consisting of —O—, —O—Z—O—, wherein the divalent bond of the —O—, and of —O—Z—O— group are in the 3,3', 3,4', 4,3' or the 4,4' positions. Z includes, but is not limited to aromatic divalent radicals having the following formulas:

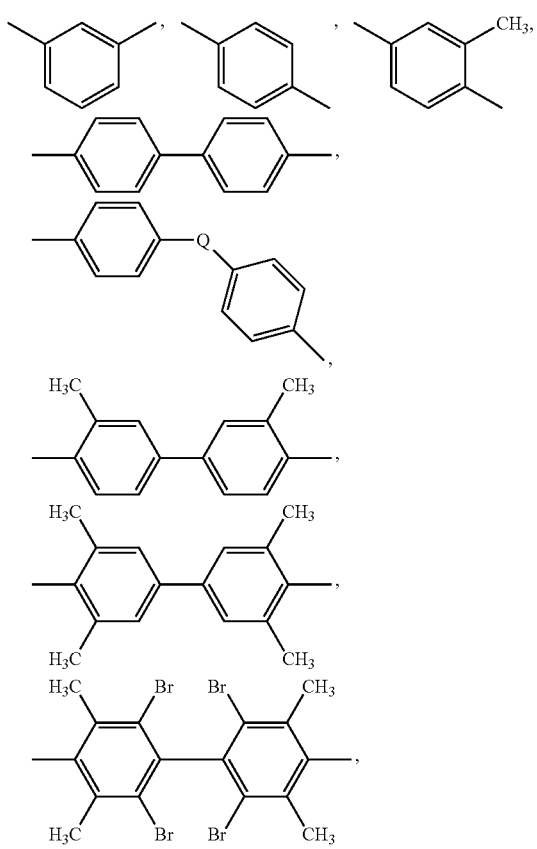

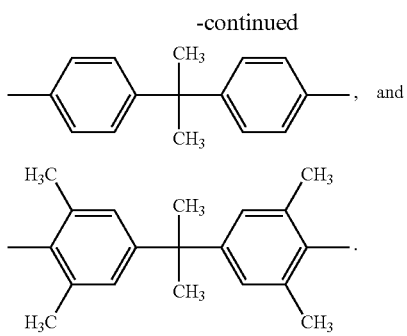

R, shown in the above formula (IV) includes, but is not limited to substituted or unsubstituted divalent organic radicals such as aromatic hydrocarbon radicals having about 6 to about 20 carbon atoms and halogenated derivatives thereof, straight or branched chain alkylene radicals having about 2 to about 20 carbon atoms, cycloalkylene radicals having about 3 to about 20 carbon atoms or divalent radicals having the following formula:

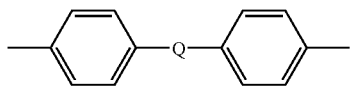

wherein Q in the above formulas includes, but is not limited to divalent moieties selected from —O—, —S—, —C(O)—, —SO$_2$—, —SO—, —C$_y$H$_{2y}$— (y being an integer from 1 to 5), and halogenated derivatives thereof.

End groups $E_1$ and $E_2$ in each of the first and second prepolymer components, independently, include groups that are capable of forming oligomer compounds with $R_1$ and/or $R_2$, as defined above and capable of crosslinking in an addition polymerization reaction to form a crosslinked polyimide structure. End group structures may include, but are not limited to at least one of the following end group containing structures: nadic end groups, including, but not limited to the following formula:

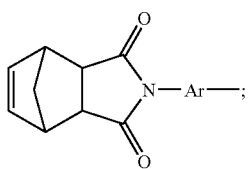

vinyl end groups including, but not limited to the following formula:

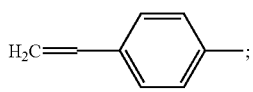

acetylene end groups including, but not limited to the following formula:

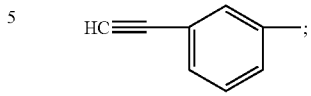

phenylethynyl end groups including, but not limited to the following formula:

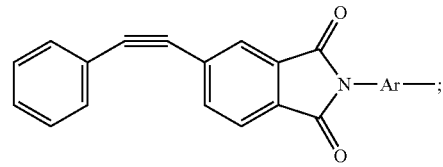

and mixtures thereof.

Ar as shown above in the nadic and phenylenthynyl end group structures may include aromatic groups, such as substituted or unsubstituted aromatic monocyclic or polycyclic linking structures. Substitutions in the linking structures may include, but are not limited to ethers, epoxides, amides, esters and combinations thereof.

An exemplary oligomer structure for use as the first and/or second prepolymer components includes the formula (V) as $R_1$ and/or $R_2$:

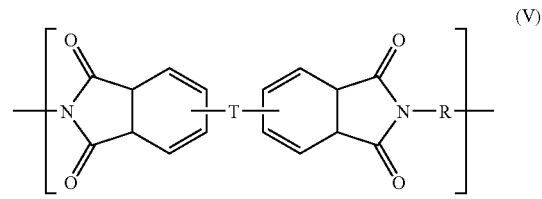

wherein T may include, but is not limited to ethers, epoxides, amides, ketones, esters and combinations thereof. An exemplary structure for the first and/or second prepolymer components having structure (V) include the formula wherein T is a —C(O)— group and R has the following formula:

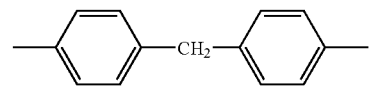

and wherein $E_1$ and $E_2$ each have the following formula:

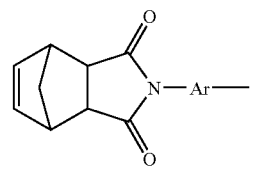

While the second prepolymer component may be an oligomer structure, as discussed above, the second prepolymer component may also include a mixture of monomer components, as shown above where formula (III) includes a monomer mixture. The M1 monomer mixture includes components capable of forming polyimide prepolymers having an endcapped oligomer structure and/or a crosslinked polyimide polymer or copolymer. M1 preferably includes a diamine, a dianhydride and an end-blocking agent having a crosslinkable group.

The diamine component of the M1 may include, but is not limited to, an aromatic diamine monomer having the following formula (VI):

$$H_2N-Ar-NH_2 \qquad (VI)$$

Ar as used in the formula (VI) preferably includes aromatic compounds, including substituted aromatic compounds and compounds having multiple aromatic rings. Substituent groups for substitution in the Ar group may include any suitable functional group, including, but not limited to halogen groups, alkyl groups, alkoxy groups, and combination thereof.

Examples of suitable diamine components may include, but are not limited to: 1,3-bis(aminophenoxy)benzene, 1,4-bis(aminophenoxy)benzene, p-phenylenediamine, ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3"-dimethylbenzidine, 3,3"-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(b-amino-t-butyl) toluene, bis(p-b-amino-t-butylphenyl) ether, bis(p-b-methyl-o-aminophenyl) benzene, bis(p-b-methyl-o-aminopentyl) benzene, 1,3-diamino-4-isopropylbenzene, bis(4-aminophenyl) sulfide, bis(4-aminophenyl) sulfone, bis(4-aminophenyl) ether, 1,3-bis(3-aminopropyl) tetramethyldisiloxane and mixtures comprising at least one of the foregoing organic diamines. Exemplary organic diamines include meta-phenylene diamine and para-phenylene diamine.

Further, these diamines are also usable in place of some or all of the hydrogen atoms on one or more of the aromatic ring(s) of each of the diamines. A like number of ethynyl groups, benzocyclobuten-4'-yl groups, vinyl groups, allyl groups, cyano groups, isocyanate groups, nitrilo groups and/or isopropenyl groups, which can act as crosslinking points, may also be introduced as substituent groups on the aromatic rings, preferably to an extent not impairing the moldability or formability.

The dianhydride component of the polyimide monomer may include, but is not limited to, monomers having an anhydride structure, wherein an exemplary structure includes a tetracarboxylic acid dianhydride structure. The dianhydride component employed may be any suitable dianhydride for forming crosslinkable or crosslinked polyimide prepolymer, polymer or copolymer. For example, tetracarboxylic acid dianhydrides, singly or in combination, may be utilized, as desired.

Illustrative examples of aromatic dianhydrides suitable for use in M1 of the second prepolymer component include: 2,2-bis(4-(3,4-dicarboxyphenoxy)phenyl)propane dianhydride; 4,4'-bis(3,4-dicarboxyphenoxy) diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis(4-(2,3-dicarboxyphenoxy) phenyl) propane dianhydride; 4,4'-bis(2,3-dicarboxyphenoxy)diphenyl ether dianhydride; 4,4'-bis(2,3-dicarboxyphenoxy) diphenyl sulfide dianhydride; 4,4'-bis (2,3-dicarboxyphenoxy)benzophenone dianhydride; 4,4'-bis(2,3-dicarboxyphenoxy) diphenyl sulfone dianhydride; 4-(2,3-dicarboxyphenoxy)-4'-(3,4-dicarboxyphenoxy) diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, 1,2,4,5-benzenetetracarboxylic dianhydride as well as mixtures comprising one of the foregoing dianhydrides.

Exemplary anhydride components include the following dianhydride compounds:

3,4,3',4'-biphenyltetracarboxylic dianhydrides having the following formula:

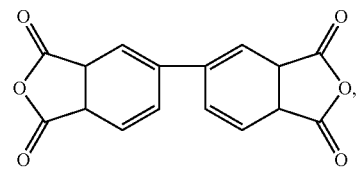

3,4,3',4'-benzophenonetetracarboxylic dianhydrides having the following formula:

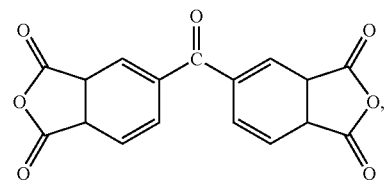

2,2-bis(3',4'-dicarboxyphenyl) hexafluoropropane dianhydrides having the following formula:

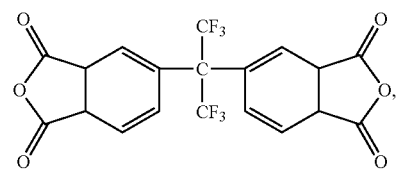

pyromellitic dianhydrides having the following formula:

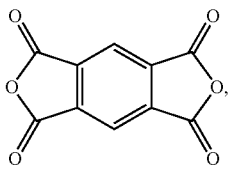

and mixtures thereof.

An exemplary dianhydride component includes dimethyl ester of 3,3',4,4'-benzophenone tetracarboxylic acid.

Depending on the fabrication process, tetracarboxylic acid monoanhydrides, tetracarboxylic compounds other than anhydrides, or their derivatives such as salts may also be used as desired instead of the above-recited dianhydrides. The dianhydride components, as described above, may be used either singly or in combination as needed.

The aromatic dianhydrides can be prepared by any suitable fabricating method known in the art. One suitable fabrication method for fabricating aromatic dianhydrides may include hydrolysis, followed by dehydration, of the reaction product of a nitro substituted phenyl dinitrile with a metal salt of dihydric phenol compound in the presence of a dipolar, aprotic solvent.

End-group compounds of the M1 group may include structures that are capable of forming oligomer compounds with the $R_1$ and/or $R_2$, as defined above and capable of crosslinking in an addition polymerization reaction to form a crosslinked polyimide structure. Crosslinkable-group-containing end blocking agents of various kinds are usable depending on the synthesis process of the polyimide, including monoamines and dicarboxylic acid anhydrides as representative examples. A variety of crosslinkable groups may be selected in accordance with molding or forming conditions.

The crosslinkable group structures contained in the end groups may include ethynyl groups, benzocyclobuten-4'-yl groups, vinyl groups, allyl groups, cyano groups, isocyanate groups, nitrilo groups, amino groups, isopropenyl groups, vinylene groups, vinylidene groups, and ethynylidene groups.

The above described, crosslinkable-group-containing end blocking agents can be used either singly or in combination. Some or all of the hydrogen atoms on one or more of the aromatic rings of the end group containing material may be replaced by a like number of substituent groups selected from halogen groups, alkyl groups, alkoxy groups, and combinations thereof.

Exemplary end group structures may include, but are not limited to, at least one the following end group containing structures: monomethyl ester of 5-bornene-2,3-dicarboxylic acids, including, but not limited to, the following formula:

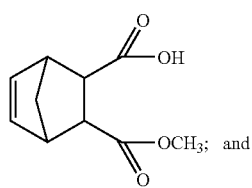 [SMILES: COC(=O)C1C2C=CC(C2)C1C(=O)O]

4-phenylehtynylphthalic anhydrides including, but not limited to the following formula:

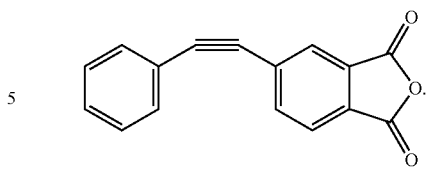

One embodiment includes the process of making polyimide resins from prepolymer components. The process for making a crosslinkable copolymer polyimide resin includes blending a first prepolymer component having the following formula:

$$E_1\text{-}[R_1]_n\text{-}E_1 \tag{I}$$

and a second prepolymer component having the following formula (I) and/or (II):

$$E_2\text{-}[R_2]_n\text{-}E_2 \tag{II}$$

or $$M_1 \tag{III}$$

wherein n, $R_1$, $R_2$, $E_1$, $E_2$ and $M_1$ are as defined above. Sufficient amounts of the first prepolymer component, the second prepolymer component and sufficient blending are provided to form a prepolymer solution or dispersion wherein the glass transition temperature of the solution or dispersion is greater than about 450° F. (232° C.) or the melt viscosity of the solution or dispersion of 1000 centipoise or greater. The first prepolymer component may be a solid or a liquid. Likewise, the second prepolymer component may be a solid or a liquid. For example, the first prepolymer mixture may be a powdered solid which is blended with a liquid second prepolymer solution. In another embodiment, a powder first prepolymer component may be blended with a powder second prepolymer component. Any combination of liquids and solid prepolymer components may be used.

The process for making a crosslinked polyimide copolymer, according to one embodiment, includes providing a prepolymer blend, including a first prepolymer component, a second prepolymer component, and a fiber. The prepolymer blend is brought into contact with the fiber and the combination of the fiber and the prepolymer blend is cured. Curing takes place using any suitable technique known in the art to initiate crosslinking of the prepolymer components. In one embodiment, the curing takes place at a temperature and pressure sufficient to provide a crosslinked polyimide copolymer having a low void content and a glass transition temperature of greater than about 450° F. (232° C.).

One embodiment includes a polyimide resin product formed from prepolymer components. An embodiment includes a crosslinked polyimide copolymer formed from the method for making a crosslinkable copolymer polyimide resin including blending a first prepolymer component having the following formula (I):

$$E_1\text{-}[R_1]_n\text{-}E_1 \tag{I}$$

and a second prepolymer component having the following formula (II and/or III):

$$E_2\text{-}[R_2]_n\text{-}E_2 \tag{II}$$

or $$M_1 \tag{III}$$

wherein n, $R_1$, $R_2$, $E_1$, $E_2$ and M1 are as defined above. Sufficient amounts of the first prepolymer component, the second prepolymer component and sufficient blending are provided to form a prepolymer solution or dispersion wherein the glass transition temperature of the solution or dispersion is greater than about 450° F. (232° C.) or the melt viscosity of the solution or dispersion is preferably as low as 1000 centipoise. The prepolymer solution or dispersion is then cured at a temperature and pressure sufficient to provide a crosslinked polyimide copolymer having a low void content and a glass transition temperature of greater than about 450° F. (232° C.).

An embodiment includes the crosslinked polyimide product. The polyimide resin product formed from the prepolymer components further includes a crosslinked polyimide copolymer having a crosslinked matrix including an $R_1$ group and a group selected from an $R_2$ group, an M group, and combinations thereof. The $R_1$ group and the $R_2$ group contained within the crosslinked matrix independently have the following formula (VII):

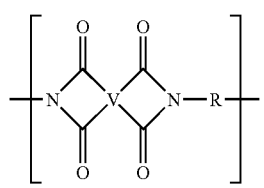

(VII)

wherein V and R are as defined above. The M group in the crosslinked matrix includes one or more of a diamine structure, a dianhydride structure and/or an end group structure in the reacted or unreacted form.

R is a substituted or unsubstituted divalent organic radical, aromatic tetracarboxylic dianhydride structure, and functional groups capable of forming oligomer compounds with the $R_1$ or $R_2$ structures, wherein the functional groups are crosslinked within the crosslinked polyimide copolymer, and combinations thereof.

In one embodiment, in order to form the prepolymer compounds, a monomeric solution mixture is provided and a first prepolymer compound is added in solid form. The monomeric solution includes a diamine, a dianhydride and an end group monomeric compound. Particularly suitable solid forms include, but are not limited to, powders which are easily dispersed and/or dissolved in the monomeric solution.

The above components, including the first prepolymer component and the second prepolymer component, may be fabricated using any known methods. Suitable methods for forming the first prepolymer components include reacting substantially equimolar amounts of dianhydride and diamine and a termination agent in a high boiling aprotic solvent under imidification conditions to form an insoluble prepolymer. The process is not limited to use of an aprotic solvent and may include any solvent composition suitable for reacting the monomer components (i.e., the dianhydride, the diamine and the termination agent).

Another embodiment includes providing a first prepolymer component and a second prepolymer component in a predetermined ratio and blending the components together in a ratio suitable to provide desired properties in the prepolymer mixture and in the cured polyimide product. Properties that may be varied with the ratio of the blending include, but are not limited to thermal oxidative stability, molecular weight, glass transition temperature, and melt viscosity of the prepolymer mixture.

Molecular weight (MW) for the prepolymer components is utilized in providing a prepolymer mixture and a crosslinked polyimide material having the desired properties. In one embodiment, powder resin having a MW of about 700-2500 g/mol is provided as a prepolymer component. The final blends ratio in this embodiment is 10-60% by weight based on imidized solids of resin blend. In another embodiment, liquid resin having a MW of about 1,000-2,500 g/mol is provided as a prepolymer component. The liquid composition includes 20-60% imidized solids as a solution in either ethanol or methanol comprising ethyl ester or methyl esters of the prepolymer components. In either the powder or liquid mixtures, the MW of the individual components may be individually selected to provide desired properties, such as MW, glass transition temperature and/or thermal oxidative stability in the prepolymer mixture and in the cross-linked polyimide resin. In another embodiment, a powder prepolymer component is mixed with a liquid prepolymer component. One mixture includes a larger difference in MW between prepolymer components, a lower MW powder mixed with a higher molecular weight liquid. Specifically, a powder prepolymer component having a MW of 800 g/mol is mixed with a liquid prepolymer component having a MW of 2,100 g/mol, constituting a 20 wt % powder prepolymer to 80 wt % liquid prepolymer. Another mixture includes a smaller difference in MW between prepolymer components. Specifically, a powder prepolymer component having a MW of 990 g/mol is mixed with a liquid prepolymer component having a MW of 1,600 g/mol, constituting a 30 wt % powder prepolymer to 70 wt % liquid prepolymer.

Glass transition temperature (Tg) is a measure of the ability of the polymer to maintain properties at elevated temperatures. Because bulk motion of the polymer is restricted below the Tg, the higher the Tg a material displays, typically, the higher the temperature capability of that material. This is, however, a measure of the temperature capabilities of the material over only short times at high temperatures.

Melt viscosity is a measure of a fluids resistance to flow at temperatures above the melt point. For processing composites, it is generally desirable to have melt viscosities below 100,000 centipoise (cps) with the preferred range or 40,000 cps-800 cps wherein the melt viscosity is dependent upon the processing utilized. If the melt viscosity is not sufficiently low, processing requires excessive pressures in order to make the resin flow. Lower melt viscosities generally lead to greater processing options due to decreased pressure needs.

Thermal Oxidative Stability (TOS) is the ability of the polymer to withstand elevated temperatures in an oxygen-containing environment, such as air, with minimal loss of weight and/or properties. Turbine engine components often operate in high pressure as well as high temperature environments and the high pressure acts to increase the concentration of oxygen accelerating the deterioration of composite properties. Since, in a composite, compression strength is a resin-dominated property, the retention of compression strength after long-time exposures to high temperatures is monitored as a measure of TOS. Weight loss over time is also used as a measure. Polymers degrade through mechanisms, such as volatilization, resulting in a composite having reduced mass due to this loss of polymer. One test used herein to measure TOS includes placing a plaque of polymeric or composite material in a chamber, increasing the temperature and pressure within the chamber to a predetermined temperature and pressure, and holding these conditions for up to 150 hrs with multiple atmospheric changes over the course of the test. The plaques are then removed and tested for weight loss and retention of compression strength. The weight loss and retention of compression strength reflect service conditions in a turbine engine and provide a measure of the longer-term stability of the polymer material. A higher TOS is important for material that will be placed in a high temperature environment for long periods of time. The crosslinked polyimide copolymer preferably has a TOS of less than about 2.0% weight loss.

Nadic end-capped prepolymer components, as represented by PMR-15 and RP-46, undergo reactions to form a low-molecular-weight oligomer typical of condensation polyimides, and also undergo an addition-type irreversible Diels-Alder reaction leading to a high-molecular weight crosslinked polyimide.

One embodiment includes utilizing the prepolymer blends in a resin film infusion (RFI) process. In RFI, a fiber containing preform is typically placed on a mold or other surface capable of providing the cured material with the desired geometry. A preferred fiber, particularly for aerospace applications, is carbon fiber. The fiber reinforcement of the preform is not limited to carbon fiber and may include any suitable fiber having high strength, sufficient stiffness, and relatively low density. The fiber for impregnation may be a fiber in any suitable form including, but not limited to uniaxial, braided, multi-layered, or woven forms. In addition, the fibers may be continuous fibers, chopped fiber, braided fiber, fiber fabric, woven fibers and noncrimp fabric, unitape fiber, fiber film or any suitable form of fiber that results in a reinforced composite material when cured. In addition, multiple types of fibers may be utilized in the preform.

The polyimide prepolymer matrix material may be placed as a film layer or layers on or within intermediate layers of the reinforcing fiber preforms to cover all or a majority of the preform. Alternatively, the film material, including the prepolymer blend, may be provided as at least a portion of the preform, wherein the material provided includes fibers onto which the resin blend has been placed into contact. The prepolymer blend resin material may be applied onto the entire surface of the reinforcing fiber preform. Alternatively, the matrix material may be interleaved between layers of the preform to cover all the layers of reinforcing fiber preform. Sufficient prepolymer material is provided to impregnate the preform during a heated resin infusion phase. Typically, the RFI method will include placing a barrier layer, such as a polytetrafluoroethylene barrier onto the prepolymer blend and/or prepreg material to assist in controlling the flow of resin. The perform and prepolymer blend may then be placed into a vacuum membrane or similar vacuum providing apparatus. The mold, fiber, resin, barrier layer and vacuum membrane may be placed into an autoclave or other controlled atmosphere device. The precise processing parameters utilized can vary and may depend upon the particular materials used as the first and second prepolymer components in the prepolymer blend.

In one embodiment, the temperature and pressure are increased within the autoclave, while simultaneously drawing a vacuum on the vacuum membrane. The increased temperature and vacuum facilitate the infiltration of the resin into the preform. The temperature and vacuum are maintained until the resin has sufficiently impregnated the preform to avoid the formation of voids. After infiltration, the temperature may be increased to begin crosslinking of the prepolymer blend. The specific parameters of the cure cycle vary and depend upon the particular materials used as the first and second prepolymer components in the prepolymer blend.

In an alternate embodiment, the polyimide prepolymer mixture may be processed using resin transfer molding (RTM). The materials utilized for the fiber reinforcement and the matrix are substantially the same as those used in the discussion of the RFI process above. However, in RTM, an injection system is utilized to inject the prepolymer mixture into a mold by pressurization of the prepolymer mixture. The mold, which has the substantial geometry of the finished component, includes the fiber preform. The pressurized prepolymer mixture impregnates the dry fibers of the fiber preform and is cured to crosslink the prepolymer mixture and form the final component. The specific parameters of the cure cycle vary and depend upon the particular materials used as the first and second prepolymer components in the prepolymer blend.

The polyimide copolymer prepolymer mixture of the first and second prepolymer components may be provided in any suitable form prior to curing. Forms that are particularly suitable include prepreg fiber materials, nanofiber filled tailorable polyimide resins, powder coated tow/preform infused with liquid. One embodiment includes a first prepolymer component in a powder form, which is blended with the liquid second prepolymer component.

In an exemplary embodiment, a prepolymer blend comprises a first prepolymer component including at least a dianhydride component, a diamine component and an end group component. In an exemplary first prepolymer component, the dianhydride component includes at least 2,3-3',4'-biphenyltetracarboxylic dianhydride ("a-BPDA"). The diamine component may include at least an amino phenoxy benzene ("APB"), such as 1,3-bis(aminophenoxy)benzene or 1,4-bis (aminophenoxy)benzene, and metaphenylene diamine (meta-PDA). The first prepolymer component may include an end group such as a phenyl ethynyl phtalic anhydride ("PEPA"). An exemplary formulation for the first prepolymer component, known as PETI® 330, is commercially available from UBE America (New York, N.Y.). PETI 330 has a published Tg of 330° C./630° F. Other PETI-type formulations may be utilized. It is believed that use of other PETI-type formulations may affect properties of the prepolymer blend, as well as properties, such as Tg, of the polyimide formed from the cured blend.

In an exemplary embodiment, the second prepolymer component includes at least a dianhydride component, a diamine component, and an end group component. At least one of the dianhydride component, the diamine component, or the end group component in the second prepolymer component is different from the dianhydride component, the diamine component, or the end group component in the first prepolymer component.

In the second prepolymer component, the dianhydride component may include at least a pyromellitic dianhydride ("PMDA"), BPDA, and BTDA. The diamine component may include at least para-PDA, and APB. The second prepolymer component may include an end group agent such as PEPA. An exemplary formulation for the second prepolymer component is known as AVIMID® RB, a thermoset polyimide resin from Cytec Industries. AVIMID® RB has a published Tg of 644° F./340° C.

In an exemplary embodiment, the molar ratio of the first prepolymer component to the second prepolymer component is selected based on the desired properties of the prepolymer blend, the crosslinked polyimide matrix, or a combination thereof. For example, a first molar ratio may provide a desired melt viscosity of the blend that is appropriate for a chosen processing technique, such as RFI. A different molar ratio may be chosen if the desired property is a higher Tg of the crosslinked polyimide matrix.

In an exemplary embodiment, the molar ratio of the first prepolymer component to the second prepolymer component may range from about 10:90 to about 40:60.

In exemplary embodiments, the first prepolymer component is provided as a powder and the second prepolymer component is provided as a mixture of monomers. In other exemplary embodiments, the first and second prepolymer components are provided as powders.

In an exemplary embodiment, a pre-imidized powder is utilized as the first prepolymer component. In an exemplary embodiment the powder comprises a reaction product of end group component, such as, but not limited to, NE, a dianhydride component, including BTDA, and a diamine component including at least metaphenylene diamine (meta-PDA) and Bis-M. An exemplary second prepolymer component comprises a mixture of monomers. For example, the second prepolymer component can include a dianhydride component including at least a mixture of BPDA and BTDA, a diamine component including at least pPDA and Bis-M, and an end group component, such as, but not limited to NE. In an exemplary embodiment, the diamine component of the second prepolymer component may further include a substitution of APB for a portion of the Bis-M. In an exemplary embodiment, up to about 10 mol % substitution of APB for Bis-M in the mixture of monomers is contemplated within the scope of the invention.

In an exemplary embodiment, the prepolymer blend exhibits prepolymer properties such as melt viscosity and molecular weight. These properties may be varied depending on the respective amounts of the first and second prepolymer components present in the blend. In certain applications, the prepolymer property may be a foremost consideration in selecting the first and second prepolymer components and their relative amounts in the prepolymer blend.

In an exemplary embodiment, the crosslinked polyimide matrix exhibits crosslinked properties such as thermal oxidative stability, glass transition temperature, molecular weight, and void content. These post-cure properties may also be varied depending on the respective amounts of the first and second prepolymer components present in the blend, prior to cure.

Other exemplary properties of the prepolymer blend, or the crosslinked polyimide matrix that may be varied include imidization temperature, maximum cure temperature, molecular weight distribution, tack, drape, ability to process using film infusion, ability to process using RTM, ability to modify the prepolymer blend with fillers or other agents, tensile strength, compression strength, inplane shear, and wet properties.

In an exemplary embodiment, a prepolymer blend comprising a first prepolymer component which may comprise a polyimide oligomer and a second prepolymer component that may comprise a polyimide oligomer, a mixture of monomers, or combination thereof, can be used as a roadmap to determine relative amounts of monomers to use in a "one pot" blend.

For example, the first prepolymer component may include a preimidized reaction product of a first blend of monomers. The second prepolymer component may include a preimidized reaction product, a blend of monomers, M, or a combination thereof. The properties of the prepolymer blends, i.e., melt viscosity, can be measured and optimized. Properties of the crosslinked polyimides, i.e., Tg, formed from curing the blends can be determined. After achieving desired outcomes in the prepolymer blends or crosslinked matrices, the theoretical molar ratio of monomer starting agents (generally dianhydrides, diamines, and end groups) can be determined from the ratios of the prepolymer components used. The monomers can then be imidized in a "one-pot" process for use as a neat resin, molding compound, film, prepreg, etc. Thus, cycle time for optimizing resin blends can be greatly reduced. Subsequent prepolymer blends can then be formulated from the monomers themselves.

In other embodiments, prepolymer blends may include a plurality of preimidized reaction products. The preimidized reaction products may be blended in various ratios to optimize desired outcomes.

Using the processes described above, prepolymer blends can be readily tailored to provide desired property outcomes in the blends and the crosslinked matrices.

EXAMPLE

A prepolymer mixture was formed from a blend of dimethyl ester of 3,3',4,4'-benzophenone tetracarboxylic dianhydride ("BTDA"), (4,4'-[1,3-phenylene bis(1-methyl-ethylidene)]bisaniline) ("Bis Aniline M"), paraphenylene diamine ("para PDA"), norbornene 2,3-dicarboxylic acid ("NE") and 3,3',4,4'-biphenyl-tetracarboxylic dianhydride (BPDA). The above blend was further mixed with a solid powder second prepolymer component having a reaction product of NE, BTDA, metaphenylene diamine (meta PDA), and Bis-Aniline M.

The liquid prepolymer component included the following molar compositional concentrations of monomers:
30 mol % Bis Aniline M,
12.9 mol % p PDA,
28.6 mol % NE and
varying mol % of BPDA and BTDA, as shown in TABLE 1, wherein the total mol % of the combination of BPDA and BTDA is 28.5 mol %.

TABLE 1

| \multicolumn{6}{c}{MOLAR COMPOSITIONS OF EXAMPLES 1–12} |
| Example | BTDA | BPDA | Bis Aniline M | p PDA | NE |
| --- | --- | --- | --- | --- | --- |
| 1 | 24.2% | 4.3% | 30.0% | 12.9% | 28.6% |
| 2 | 24.2% | 4.3% | 30.0% | 12.9% | 28.6% |
| 3 | 24.2% | 4.3% | 30.0% | 12.9% | 28.6% |
| 4 | 21.4% | 7.1% | 30.0% | 12.9% | 28.6% |
| 5 | 21.4% | 7.1% | 30.0% | 12.9% | 28.6% |
| 6 | 21.4% | 7.1% | 30.0% | 12.9% | 28.6% |
| 7 | 24.2% | 4.3% | 30.0% | 12.9% | 28.6% |
| 8 | 24.2% | 4.3% | 30.0% | 12.9% | 28.6% |
| 9 | 24.2% | 4.3% | 30.0% | 12.9% | 28.6% |
| 10 | 21.4% | 7.1% | 30.0% | 12.9% | 28.6% |
| 11 | 21.4% | 7.1% | 30.0% | 12.9% | 28.6% |
| 12 | 21.4% | 7.1% | 30.0% | 12.9% | 28.6% |

A solid powder prepolymer component was added to the liquid monomer mixture in Examples 1-12. The solid powder prepolymer component included a reaction product of the following components:
40 mol % NE,
20 mol % BTDA,
28 mol % metaphenylene diamine (meta PDA), and
12 mol % bis-aniline M.

The reaction product forming the solid powder prepolymer component was a polyimide oligomer known in the art and is commercially available as a powder. One commercially available prepolymer corresponding to the above polyimide oligomer is MM 9.36 available from Maverick Corporation, Blue Ash, Ohio.

As shown in Table 2, the solid powder prepolymer was blended with the liquid monomer prepolymer to form a mixture that has the Molecular Weight ("MW") and the structural unit size ("n") shown in the Examples. Examples 1-6 included a MW of 2100 g/mol and a structural unit size of 3. Examples 7-12 included a MW of 1600 g/mol and a structural unit size of 2. The ratio between BTDA and BPDA was varied as shown in Table 1 and the amount of powder added was varied, as shown in TABLE 2.

The mixture was cured at a temperature of about 600° F. (316° C.) and a pressure of 200 psi for 4 hours. The glass transition temperature ("Tg") for the cured Examples are shown in TABLE 3. The cured sample was then subjected to a one of 2 post cures. The first post cure includes exposing the sample to a temperature of about 600° F. (316° F.) at ambient pressure for 12 hours. The Tg values for the first post cured Examples are shown in TABLE 3. The second post cure includes exposing the sample to a temperature of about 625° F. (329° C.) at ambient pressure for 12 hrs. The Tg values for the second post cured Examples are shown in TABLE 3.

In addition to the post curing, the samples were also measured for thermal oxidative stability (TOS). The TOS for Examples 1-12 are shown in TABLE 4. Likewise, the compression strength of the samples was measured after subjecting the samples to thermal cycling from room temperature to 550° F. (288° C.) for 380 cycles. The compression data is shown in TABLE 4.

As shown in Examples 1, 4, 7 and 10, a lower Tg and a higher TOS weight loss result from the presence of the liquid monomer mixture alone. The mixture of the liquid prepolymer component with the solid prepolymer component resulted in a Tg of greater than about 500° F. (260° C.) in the cured state and a thermal oxidative stability having a TOS weight loss of less than 2.0%. In the post cured state, the Tg of Examples reached 600° F. (316° C.) or greater.

TABLE 2

TAILORABLE POLYIMIDE RESINS NADIC END CAP

| Example | Liquid Formulated MW (g/mol) | n = | Monomer Substitution in Liquid Prepolymer Component** | Powder Prepolymer Component Addition |
|---|---|---|---|---|
| 1 | 2100 | 3 | 15% | 0% |
| 2 | 2100 | 3 | 15% | 15% |
| 3 | 2100 | 3 | 15% | 30% |
| 4 | 2100 | 3 | 25% | 0% |
| 5 | 2100 | 3 | 25% | 15% |
| 6 | 2100 | 3 | 25% | 30% |
| 7 | 1600 | 2 | 15% | 0% |
| 8 | 1600 | 2 | 15% | 15% |
| 9 | 1600 | 2 | 15% | 30% |
| 10 | 1600 | 2 | 25% | 0% |
| 11 | 1600 | 2 | 25% | 15% |
| 12 | 1600 | 2 | 25% | 30% |

**percent of BTDA substituted by BPDA in liquid Resin
MM 9.36 powder resin formulated MW = 936

TABLE 3

GLASS TRANSITION TEMPERATURE

| Example | As Cured Tg (° F.) | Post Cure 1 Tg (° F.) | Post Cure 2 Tg (° F.) |
|---|---|---|---|
| 1 | 478 | 530 | 551 |
| 2 | 501 | 551 | 589 |
| 3 | 530 | 576 | 595 |
| 4 | 488 | 531 | 553 |
| 5 | 500 | 556 | 583 |
| 6 | 532 | 579 | 606 |
| 7 | 514 | 552 | 563 |
| 8 | 520 | 561 | 590 |
| 9 | 545 | 580 | 606 |
| 10 | 501 | 552 | 578 |
| 11 | 516 | 572 | 590 |
| 12 | 532 | 584 | 609 |

TABLE 4

| Example | THERMAL OXIDATIVE STABILITY TOS Weight Loss (%) | COMPRESSION STRENGTH Compression (ksi) |
|---|---|---|
| 1 | 4.83 | 56.95 |
| 2 | 1.42 | 89.75 |
| 3 | 1.62 | 78.94 |
| 4 | 2.23 | 78.87 |
| 5 | 1.39 | 85.16 |
| 6 | 1.84 | 75.67 |
| 7 | 2.8 | 90.57 |
| 8 | 1.54 | 94.09 |
| 9 | 1.91 | 92.9 |
| 10 | 1.25 | 97.76 |
| 11 | 1.44 | 98.19 |
| 12 | 1.67 | 91.61 |

In an exemplary embodiment, an optimized resin blend is prepared from the monomers from which the initial prepolymer components were formed. For example, an optimized resin blend may include, in terms of molar ratio, about 2 NE:1.35 BTDA:0.35 BPDA:0.42 mPDA:1.44 BisM:0.84 pPDA.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A prepolymer blend comprising:

a first cross-linkable prepolymer component comprising at least a first polyimide oligomer having the formula:

$E_1$-$[R_1]_n$-$E_1$; and a second cross-linkable prepolymer component comprising $M_1$, wherein $M_1$ is capable of forming a second polyimide oligomer different than the first polyimide oligomer having the formula $E_2$-$[R_2]_n$-$E_2$;

wherein $R_1$ and $R_2$ independently comprise the following structure:

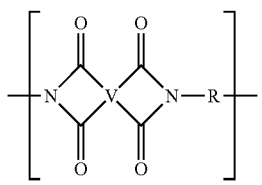

wherein n comprises from about 1 to about 5, wherein V is a tetravalent aromatic monocyclic or polycyclic linking structure, R is a divalent organic radical, $E_1$ and $E_2$ independently comprise crosslinkable functional groups, and wherein $M_1$ comprises a mixture of unreacted monomeric compounds including a diamine component, a dianhydride component, and an end group component, the diamine component comprising at least two diamine compounds, the dianhydride component comprising at least two dianhydride compounds, and the end group component comprising at least one end group compound;

wherein the prepolymer blend, prior to cure, provides at least one predetermined prepolymer blend property; and wherein the prepolymer blend, when cured under suitable cure conditions, provides a crosslinked polyimide matrix having at least one predetermined crosslinked matrix property.

2. The prepolymer blend according to claim 1 wherein the at least one predetermined prepolymer blend property is selected from the group consisting of a melt viscosity of the prepolymer blend, a molecular weight of the prepolymer blend, a maximum cure temperature of the prepolymer blend, tack of the prepolymer blend, drape of the prepolymer blend, processability of the prepolymer blend using resin film infusion (RFI), and processability of the prepolymer blend using resin transfer molding (RTM).

3. The prepolymer blend according to claim 2 wherein the predetermined prepolymer blend property is the melt viscosity being within a range of from about 800 cps to less than about 100,000 cps.

4. The prepolymer blend according to claim 2 wherein the predetermined prepolymer blend property is the melt viscosity being within a range of from about 800 cps to about 40,000 cps.

5. The prepolymer blend according to claim 1 wherein the at least one predetermined crosslinked matrix property is selected from the group consisting of a thermal oxidative stability of the crosslinked polyimide matrix, a glass transition temperature of the crosslinked polyimide matrix, a molecular weight of the crosslinked polyimide matrix, a void content of the crosslinked polyimide matrix, tensile strength of the crosslinked polyimide matrix, compression strength of the polyimide matrix, and inplane shear of the polyimide matrix.

6. The prepolymer blend according to claim 5 wherein the predetermined crosslinked matrix property is the glass transition temperature being at least about 450° F. (232° C.).

7. The prepolymer blend according to claim 5 wherein the predetermined crosslinked matrix property is the glass transition temperature being at least about 550° F. (288° C.).

8. The prepolymer blend according to claim 1 wherein the diamine component provides at least about 40 mol % of the second prepolymer component.

9. The prepolymer blend according to claim 1 wherein the dianhydride component provides not more than about 30 mol % of the second prepolymer component.

10. The prepolymer blend according to claim 1 wherein the end group component provides not more than 30 mol % of the second prepolymer component.

11. The prepolymer blend according to claim 1 wherein $M_1$ consists essentially of at least about 40 mol % of the diamine component, not more than about 30 mol % of the dianhydride component, and not more than about 30 mol % of the end group component.

12. The prepolymer blend according to claim 1 wherein in the second prepolymer component the diamine component includes 4,4'-(1,3-phenylene-bis(1-methylethylidene))bisaniline (bisaniline-M) and 1,4-phenylenediamine (para-PDA), or derivatives thereof; the dianhydride component includes 3,4,3',4'-benzophenonetetracarboxylic dianhydride (BTDA) and 3,4,3',4'-biphenyltetracarboxylic dianhydride (BPDA), or derivatives thereof and the end group component is at least one member of the group consisting of monomethyl ester of 5-norbornene 2,3-dicarboxylic acid (NE) and derivatives thereof.

13. The prepolymer blend according to claim 1 wherein the first and second prepolymer components are present in predetermined relative amounts dependent upon the predetermined prepolymer blend property, the predetermined crosslinked matrix property, or a combination thereof.

14. The prepolymer blend according to claim 1 wherein the first prepolymer component is a solid and the second prepolymer component is a liquid, and wherein the first prepolymer component comprises from about 20 wt % to about 30 wt % of the prepolymer blend.

15. The prepolymer blend according to claim 1 wherein the first prepolymer component has a molecular weight of from about 700 g/mol to about 2500 g/mol.

16. A crosslinked polymer matrix formed after cure under suitable cure conditions, of the prepolymer blend according to claim 1 and having a glass transition temperature of at least about 450° F. (232° C.).

* * * * *